US012517292B2

(12) United States Patent
Lee et al.

(10) Patent No.: US 12,517,292 B2
(45) Date of Patent: Jan. 6, 2026

(54) METHOD PROVIDING SUPPRESSION OF EXCITATION FIELD FOR QUANTUM LIGHT EMITTERS USING OPTICAL INTERFEROMETERS

(71) Applicant: Photonic Inc., Coquitlam (CA)

(72) Inventors: Youn Seok Lee, Coquitlam (CA); Gary Wolfowicz, Coquitlam (CA); Mohsen Keshavarz Akhlaghi, Coquitlam (CA)

(73) Assignee: Photonic Inc., Coquitlam (CA)

( * ) Notice: Subject to any disclaimer, the term of this patent is extended or adjusted under 35 U.S.C. 154(b) by 542 days.

(21) Appl. No.: 17/821,755

(22) Filed: Aug. 23, 2022

(65) Prior Publication Data

US 2024/0069261 A1 Feb. 29, 2024

(51) Int. Cl.
  *G02B 5/28* (2006.01)
  *G01J 1/44* (2006.01)
  *G02B 6/26* (2006.01)
  *H01S 5/14* (2006.01)

(52) U.S. Cl.
  CPC .............. *G02B 5/284* (2013.01); *G01J 1/44* (2013.01); *G02B 6/26* (2013.01); *G01J 2001/442* (2013.01); *H01S 5/14* (2013.01)

(58) Field of Classification Search
  CPC ...... G02B 5/284; G02B 6/26; G02B 6/12004; G02B 6/29349; G02B 2006/12121; G01J 1/44; G01J 2001/442; G01J 3/0262; G01J 3/453; G01J 3/4406; H01S 5/14
  See application file for complete search history.

(56) References Cited

U.S. PATENT DOCUMENTS

| 4,644,154 | A | * | 2/1987 | Brogårdh | G01D 5/268 250/227.21 |
|---|---|---|---|---|---|
| 5,833,617 | A | * | 11/1998 | Hayashi | A61B 5/0084 250/461.1 |
| 6,070,096 | A | * | 5/2000 | Hayashi | A61B 5/0071 600/477 |
| 6,078,705 | A | * | 6/2000 | Neuschafer | G01N 21/7703 385/12 |
| 6,289,144 | B1 | * | 9/2001 | Neuschafer | G01N 21/7703 422/82.11 |
| 6,961,490 | B2 | * | 11/2005 | Maisenhoelder | G02B 6/124 385/37 |

(Continued)

OTHER PUBLICATIONS

International Preliminary Report on Patentability/IPRP for sister international application PCT/CA2023/05088 issued Nov. 10, 2023 (7 pp.) (Year: 2023).*

(Continued)

*Primary Examiner* — Andrew Jordan
(74) *Attorney, Agent, or Firm* — Oyen Wiggs Green & Mutala LLP (57) ABSTRACT

Excitation used to produce luminescence is cancelled using interference with an excitation cancelling beam by controlling or setting a phase difference. An excitation beam and an excitation cancelling beam are produced from a common source and the excitation beam directed quantum light emitter to produce luminescence. A residual excitation beam and the excitation cancelling beam are coupled to interfere destructively so that the luminescence is available for detection or otherwise without substantial portions of the excitation beam.

8 Claims, 9 Drawing Sheets

(56) References Cited

U.S. PATENT DOCUMENTS

| | | | |
|---|---|---|---|
| 7,215,850 B2 * | 5/2007 | Maisenhoelder | G01N 21/7743 430/5 |
| 8,032,027 B2 * | 10/2011 | Popovic | G02B 6/29395 398/85 |
| 8,153,066 B2 * | 4/2012 | Weisbuch | G01N 21/648 422/68.1 |
| 8,259,389 B2 * | 9/2012 | Pastouret | C03B 37/01853 359/341.1 |
| RE46,165 E * | 9/2016 | Weisbuch | G01N 21/7703 |
| 10,090,466 B2 * | 10/2018 | Chan | G01J 5/10 |
| 10,215,816 B2 * | 2/2019 | Kawabata | H01S 5/14 |
| 11,692,938 B2 * | 7/2023 | Kabiri | G01N 21/6454 435/6.1 |
| 12,203,853 B2 * | 1/2025 | Kabiri | G01N 21/6402 |
| 2002/0076154 A1 * | 6/2002 | Maisenhoelder | G02B 6/136 385/12 |
| 2004/0190906 A1 * | 9/2004 | Jain | H04B 10/2519 398/147 |
| 2005/0175358 A1 * | 8/2005 | Ilchenko | G02F 1/011 398/198 |
| 2005/0201899 A1 * | 9/2005 | Weisbuch | G01N 21/7703 422/82.11 |
| 2006/0008206 A1 * | 1/2006 | Maisenhoelder | G02B 6/124 385/37 |
| 2006/0083284 A1 * | 4/2006 | Paldus | H01S 5/14 372/97 |
| 2009/0226127 A1 | 9/2009 | Heideman et al. | |
| 2010/0118388 A1 * | 5/2010 | Pastouret | C01F 7/441 977/932 |
| 2016/0313417 A1 * | 10/2016 | Kawabata | G02F 1/33 |
| 2016/0356708 A1 | 12/2016 | Bennett et al. | |
| 2018/0026185 A1 * | 1/2018 | Chan | H10F 77/12 250/338.4 |
| 2019/0195781 A1 | 6/2019 | Waclawek et al. | |
| 2020/0345235 A1 * | 11/2020 | Vakoc | A61B 5/0075 |
| 2020/0379180 A1 * | 12/2020 | Yamauchi | G02B 6/29302 |
| 2020/0400568 A1 * | 12/2020 | Kabiri | G01N 21/7703 |
| 2021/0208473 A1 | 7/2021 | Jackel et al. | |
| 2021/0270596 A1 | 9/2021 | Pupeza et al. | |
| 2021/0273733 A1 | 9/2021 | Mannhart et al. | |
| 2023/0140906 A1 * | 5/2023 | Goldman | G06N 10/40 324/304 |
| 2024/0069261 A1 * | 2/2024 | Lee | G01J 3/0262 |
| 2024/0142378 A1 * | 5/2024 | Kabiri | G01N 21/6428 |
| 2024/0361181 A1 * | 10/2024 | Keshavarz Akhlaghi | G01J 1/0425 |
| 2024/0427083 A1 * | 12/2024 | Keshavarz Akhlaghi | H01L 21/308 |

OTHER PUBLICATIONS

Huber et al. "Filter-free single-photon quantum dot resonance fluorescence in an integrated cavity-waveguide device," Optica, 7(5): 380-385 (May 2020).

Politi et al., "FWM conversion with pump suppression for filterless optical packet switching applications," Optics Communications, 271 (2): 361-364 (Mar. 2007).

Uppu et al., "On-chip deterministic operation of quantum dots in dual-mode waveguides for a plug-and-play single-photon source," Nature Communications 11 (1):1-6 (Jul. 2020).

Wang et al., "Towards optimal single-photon sources from polarized microcavities," arXiv: 1907.06818, 28 pages (Nov. 2019).

International Search Report and Written Opinion dated Nov. 21, 2023, from International Patent Application No. PCT/CA2023/051088, 8 pp.

* cited by examiner

METHOD PROVIDING SUPPRESSION OF EXCITATION FIELD FOR QUANTUM LIGHT EMITTERS USING OPTICAL INTERFEROMETERS

FIELD

The disclosure pertains to distinguishing excitation light from luminescence produced in response to the excitation light.

BACKGROUND

In applications of optical sources that produce beams in response to an excitation beam, it can be difficult to separate beams produced by the excitation beam from the excitation beam itself. This is especially problematic for optical sources that produce low beam powers such as single or few photons. For example, detection of single photons produced by directing an excitation beam to a luminescent material is often complicated by the presence of the excitation beam along with the luminescent emission. In some implementations, the luminescent emission and the excitation beam have similar characteristics such as wavelength and state of polarization and both are directed to a detector as they are difficult to separate, thus decreasing available signal-to-noise ratio. Alternative approaches to separating luminescent from excitation light are needed. It is desirable to suppress the excitation beam at the detector to improve the signal-to-noise ratio in the detection of the luminescent emission.

SUMMARY

Systems, methods, and apparatus are provided to cancel excitation light that propagates with luminescence generated by the excitation light. Typically, an excitation beam is directed to a luminescent emitter to produce luminescence and a residual excitation beam. The luminescence and residual excitation beam are combined with an excitation cancelling beam. A relative phase of the residual excitation beam and the excitation cancelling beam is selected so that the residual excitation beam and the excitation cancelling beam interfere destructively. The excitation beam and the excitation cancelling beam are typically formed with a common source beam and optical paths defined using unguided or guided beam propagation.

The foregoing and other features, and advantages will become more apparent from the following detailed description, which proceeds with reference to the accompanying figures.

DETAILED DESCRIPTION

While the problem of separating luminescence and excitation light is especially important for application involving single photon emission, in many other situations it is also desirable to suppress the excitation beam. Disclosed herein are systems, methods, and apparatus that address the suppression of an excitation light from luminescent emission. In these examples, an additional beam (an "excitation cancelling beam") is provided to reduce the amplitude of an excitation beam used to generate luminescence. Such an excitation cancelling beam can be passively generated from an excitation beam without active beam shaping;

Definitions and Terminology

As used herein, a luminescent emission or luminescence refers to photoluminescence produced in response to absorption of one or more excitation photons. In particular, the examples are described with reference to fluorescence in which photons are produced within less than 1, 10, 100 ns, 1 µs, or 10 µs of absorption of excitation photons. Other types of luminescent emitters can be used such as phosphorescent emitters but for emitters in which excitation photons and luminescent emission have sufficient temporal separation, separation of excitation light and luminescence can be accomplished based on the temporal separation instead of or in addition to the excitation cancellation approaches disclosed herein. As used herein, a quantum emitter (QE) is a luminescent emitter that is operable to produce a single photon in response to irradiation with an excitation beam. While the disclosed approaches are described with respect to excitation cancellation in photoluminescence, emitters associated with other types of fluorescence and phosphorescence can be used.

The disclosed approaches can be based on various types of luminescent emitter such as, for example, quantum dots or colour centres. Colour centres are defects in solid-state systems with electronic transitions lying within a band gap of a host material. These transitions lead to a characteristic absorption and emission of light and, in high concentrations give the host material a characteristic colour. While there are many types of colour centres, some of these can be integrated into silicon and intrinsically operate at telecom wavelengths between about 1200 nm and 1650 nm. One example of such colour centers are radiation damage centres in silicon. One particular radiation damage centre is the T centre, a paramagnetic defect thought to be made of two carbon atoms and one hydrogen. The T centre notably possesses highly coherent electron and nuclear spin degrees of freedom and narrow, spin-dependent ensemble optical transitions near 1326 nm in the telecommunications O-band. These properties make the T centre a convenient candidate for integration into applications such as quantum networks with long-lived quantum memory and computing capabilities. The emission properties of colour centres and other luminescent emitters in response to an excitation beam can be enhanced by coupling to an optical cavity.

Beam portions that propagate in a common direction with an input excitation beam are referred to herein as forward propagating or forward beams while beams that propagate in the opposite direction are referred to as backward propagating or backward beams As used herein, a resonant emitter comprises a luminescent material situated in an optical resonator. The luminescent material can be situated along a portion or all of the optical path defined by the optical resonator. The optical resonator can be a Fabry-Perot resonator which includes a linear optical path terminated by reflectors that are planar or curved having a resonator Q and finesse that are functions of the reflectivity of the reflectors. Other types of resonators such as ring resonators, micro-ring resonators, or photonic crystal resonators can be used and the resonator optical path can be a guided or unguided optical path. Resonator characteristic such as optical path length, refractive index, Q, finesse, and mode volume are selected to enhance luminescent emission based on the so-called Purcell effect. Fabry-Perot resonators can be defined with reflectors having the same or different reflectivities and such resonators are referred to as symmetric and asymmetric, respectively. In some examples, asymmetric Fabric-Perot resonators are configured to preferentially provide forward or backward propagating luminescence. For example, ignoring losses, an input-side reflector can have a reflectivity R1 (transmittance 1−R1) while the output-side has a reflectivity R2 greater than or less than R1. For R2=100%, no forward propagating luminescent beams are output; for R2<R1, forward propagating luminescent beams are favored.

Typically, an excitation wavelength associated with an excitation beam and a wavelength associated with an emission wavelength are substantially the same. The optical resonator is resonant at this substantially common wavelength to enhance both the excitation efficiency and collection efficiency. However, if the two wavelengths are substantially different, it is generally preferable that the resonator is resonant at the emission wavelength but in this case, the laser producing the excitation beam is off-resonance and may be at a sufficiently different wavelength so that it can be attenuated using spectral filters.

Optical radiation used to produce luminescence is referred to herein as excitation light or an excitation beam. At least a portion of excitation light or an excitation beam is absorbed to produce luminescence. The remaining portion of the excitation light or excitation beam is referred to herein as residual excitation light or a residual excitation beam. Optical radiation used to suppress the residual excitation light or the residual excitation beam is referred to herein as excitation cancelling light or an excitation cancelling beam. Complete elimination of the residual excitation light that co-propagates with luminescence produced in response to the excitation light is often desirable. But, as used herein, attenuation of excitation light by factors of 2, 5, 10, 20, 50, 100 or more is generally satisfactory and is referred to herein as excitation cancellation. In addition, any combining of excitation cancelling light with residual excitation light that produces a combined intensity of less than ½, ¼, ⅕, 1/10, 1/20, 1/50, 1/100, or less than an intensity of the residual excitation light is referred to as excitation cancellation. Excitation cancellation is generally intended to increase signal-to-noise ratio in a detected signal associated with luminescence and for this reason, implementations of excitation cancellation that exhibit low loss to the luminescent signal of interest are preferred. In the examples, excitation, residual excitation cancelling, and luminescence beams are shown as pulsed for convenience as these can be either pulsed or continuous. As used herein, beam or light refers to propagating electromagnetic radiation in a wavelength range of between 200 nm and 25 μm. Any particular beam can consist of one or many photons. Luminescence produced in response to an excitation beam is referred to also a luminescence beam although only a portion of the luminescent light produced is used or collected.

In some examples, optical beams propagate as unguided beams or as guided beams in optical waveguides that can be defined in or on substrates such as silicon-on-insulator (SOI), AlGaAs, InGaAs, InP, InAlAs, Ge, GaAs, SiC or other semiconductors, glass or fused silica, plastics, polymers, or other substrates or optical fibers such as single mode or multimode fibers including polarizing and polarization retaining fibers. Waveguides can be strip, rib, photonic crystal, hollow tube, buried channel, strip-loaded, ridge, or diffused waveguides. In general, the disclosed approaches can use optical paths that are guided, unguided, or combinations thereof. It can be convenient to define waveguides in or on materials that can be used to define emitters and/or detectors. Single mode waveguides are generally used. Alternatively, substrates on which emitters and/or detectors can be formed can be used. In other examples, optical beams propagate without guiding such as in free space or in gas, liquid, or solid media.

A source beam is typically divided by a beam splitter into excitation beam and an excitation cancelling beam. The excitation beam is directed to a luminescent emitter to produce luminescence. The excitation cancelling beam is combined with the residual excitation beam and the luminescence to suppress the residual excitation beam. Excitation cancellation is achieved by arranging the phase of the excitation cancelling beam to be 180 degrees out of phase with the residual excitation beam within ±30, ±20, ±10, ±2, ±1 degrees or less. Similarly, beams are referred to as being in phase if they have a relative phase difference of less than ±30, ±20, ±10, ±2, ±1 degrees or less. The intensities (or amplitudes) of each of the residual excitation beam and the excitation cancelling beam are preferably matched to within ±20%, ±10%, ±5%, ±2%, ±1%, or less. Larger intensity or amplitude differences limit the extent to which a residual excitation beam and an excitation cancelling beam provide cancellation. For example, an excitation cancelling beam having a much higher intensity than a residual excitation beam results in portions of the excitation cancelling beam continuing to co-propagate with luminescence generated in response to the excitation beam. In applications of the disclosed methods, systems, and devices, the relative phase between the residual excitation beam and the excitation cancelling beam is selected for destructive interference and the amplitudes (or intensities) of the residual excitation beam and the excitation cancelling beam are selected so that the destructive interference results in an output amplitude (or intensity) of the combined residual excitation beam and the excitation cancelling beam that is less than 10%, 1%, 0.1%, 0.01%, 0.001%, or less of the amplitude (or intensity) of the residual excitation beam. Deviations in either amplitude or phase from preferred values result in reductions in cancellation. The residual excitation beam and the excitation cancelling beam are preferably in substantially the same state of polarization (SOP) to destructively interfere. In the disclosed examples, SOP control devices are not shown. Relative phases are preferably established passively based on path lengths associated with the excitation beam and the excitation cancelling beam. For example, phase tuning can be done on chips defining waveguides by choosing suitable a path length difference between beams associated with different paths. Active phase control and phase shifters can be used but tend to increase complexity and cost.

As discussed below, for pulsed excitation beams, an excitation cancelling beam is arranged to provide temporal overlap and spectral overlap in conjunction with resonator properties when resonant emitters are used by selecting propagation times along optical paths associated with excitation beams and residual excitation beams.

A phase shift between excitation beam and excitation cancelling beam paths can be established based on respective path lengths and refractive indices along the respective paths. The effective path length based on refractive index or indices and physical length is referred to as herein as optical path length. In the examples, a phase shifter or phase shift region is indicated generally in an optical path associated with an excitation cancelling beam but phase shifters or phase shift regions can be provided in one or both excitation beam and excitation cancelling beam paths. While it is desirable that optical path lengths are established to produce destructive interference without active control, active optical phase modulators can be used based on the electro-optic effect, the acousto-optic effect or in other ways. For example, phase modulation in silicon waveguide devices can be based on carrier density modulation or thermal modulation.

For convenient explanation, optical devices, components, or structures that are operable to divide an input beam into two or more beams are referred to as beam splitters. In the examples, beam splitters having two inputs and two outputs are used, but beam splitters having additional inputs and outputs can be used. Beam splitters also serve as beam combiners with inputs corresponding to beam splitter outputs and outputs corresponding to beam splitter inputs. While beam splitters can act as beam combiners, they will be referred to herein generally as beam splitters. Beam splitters can be implemented with optical devices suitable for use with unguided optical beams such beam splitter plates, beam splitter cubes, polarizing beam splitter cubes, dichroic beam splitter plates or cubes, holographic optical elements, diffraction gratings or with optical devices suitable for use with guided beams such a waveguide couplers, fused fiber couplers, or others. Splitting ratios between beam splitter inputs and outputs can be varied but are generally selected to reduce the attenuation of luminescence. In this disclosure, an optical beam received by beam splitter is usually split into portions with amplitudes or intensities based on a selected split ratio and particular split ratios are provided in some examples. A portion of an excitation beam, a residual excitation beam, or luminescence produced at a beam splitter is referred to herein without reference to "portion" unless necessary for clarity.

Optical systems are illustrated with beam propagation along one or more linear optical paths and it will be appreciated that any such optical path can be bent or folded using prisms, mirrors, holographic elements, or other optical components or devices. The optical paths can be either guided or unguided optical paths. Beam portions that propagate in a common direction with an input excitation beam are referred to herein as forward propagating or forward beams while beams that propagate in the opposite direction are referred to as backward propagating or backward beams. In some examples, asymmetric Fabry-Perot resonators are configured to preferentially provide forward or backward propagating luminescence.

Beam sources include lasers such as gas lasers, laser diodes, external cavity semiconductor lasers, fiber lasers, solid state lasers such as glass or crystal-based lasers or other sources with coherence lengths that permit destructive interference of excitation cancelling beams and residual excitation beams. For example, light emitting diodes or other sources with limited coherence can be used with optical path differences less than a coherence length. Sources can be pulsed with intensities selected to produce one, two, or more photons via luminescence on demand.

The disclosed systems and methods for suppressing excitation light are referred to "excitation cancellation" systems and methods. Since the goal of excitation cancellation scheme is to improve the signal-to-noise ratio in detection of emitted light, it is highly desirable to achieve this goal without introducing additional sources of loss into the network. For this reason, beam splitter splitting ratios can be selected to favor luminescence output.

Beam splitters such as fiber coupler and beam splitter plates are used to combine beams to produce destructive or constructive interference. For a beam splitter (i.e., a beam combiner as discussed above) having two inputs and two outputs (such as two fibers in a fiber coupler, beam splitter reflectance and transmittance in a beam splitter plate or cube), the beam splitter produces a 180 degree phase shift between beam portions that are coupled to the different outputs. Beams arriving either in phase or 180 degrees out of phase will interfere destructive at one output and constructively at another. For example, if in-phase input beams interfere constructively at a first output and destructively at a second, changing input beam relative phase by 180 degrees produces constructive interference at the second output and destructive interference at the first output. As used herein, references to relative beam phase are used to indicated whether beams are configured to interfere destructively or constructively with respect to an intended output. Beams associated with cancellation (such as an excitation beam and an associated excitation cancellation beam) are referred to as out of phase while beams that are to be output (such as forward and backward propagating luminescence) are referred to as in phase. For out of phase beams, while destructive interference is associated with a first beam splitter output, constructive interference is associated with a second beam splitter output.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest,", "best," "minimum," or the like. It will be appreciated that such descriptions are intended to indicate that a selection among many used functional alternatives can be made, and such selections need not be better, smaller, or otherwise preferable to other selections.

Example 1. Excitation Cancellation with Pseudo-Active Phase Control

Figure 1:
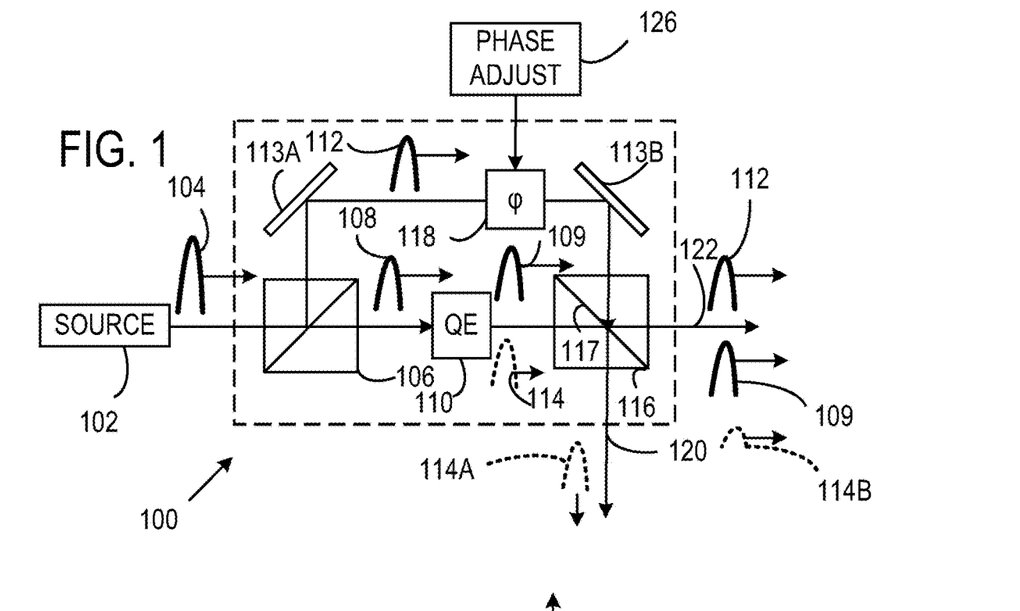
FIG. 1 illustrates a representative excitation cancellation system that includes active phase control.

Referring to FIG. 1, an optical system 100 that provides excitation cancellation includes a beam source 102 such as a laser that directs a source beam 104 to a first beam splitter 106, shown as a beam splitter cube. The first beam splitter 106 splits the source beam 104 into an excitation beam 108 that is directed to a luminescent emitter 110, shown as a quantum emitter (QE). The first beam splitter 106 also produces an excitation cancelling beam 112. The excitation cancelling beam 112 and the excitation beam 108 are shown as reflected and transmitted, respectively, but can be transmitted and reflected beams instead, or otherwise produced such as with a waveguide beam splitter. At the luminescent emitter 110, the excitation beam 108 produces luminescence 114. (As used in the illustrations, solid lines are used to indicate portions of a source, excitation, or excitation canceling beam and dashed lines to indicate luminescence). The luminescence 114 and a residual excitation beam 109 are then incident to a second beam splitter 116 which is situated to reflect a portion of the residual excitation beam 109 to an output 120 and transmit a portion to an exit 122. The excitation cancelling beam 112 is directed a first reflector 113A, a phase modulator 118, a second reflector 113B and then to the second beam splitter 116. A portion of the excitation cancelling beam 112 is transmitted to the output 120 as combined with reflected portions of the luminescence 114 and the residual excitation beam 109. Another portion of the excitation cancelling beam 112 is reflected as combined with transmitted portions of the luminescence 114 and the residual excitation beam 109. A relative phase between the excitation cancelling beam 112 and the residual excitation beam 109 is set with the phase modulator 118 in response to a drive signal from a modulator control circuit 126. With suitable phase adjustment, a relative phase between the excitation cancelling beam 112 and the residual excitation beam 109 is set to provide destructive interference at the output 120, i.e., the beams are out of phase. With the same adjustment, the excitation cancelling beam 112 and the residual excitation beam 109 will be in phase at the exit 122 to interfere constructively. The beam splitter 116 produces a phase shift of 180 degrees between transmitted and reflected beams so that the excitation cancelling beam 112 and the residual excitation beam 109 can be in phase as incident to the beam splitter reflective surface 117. Whether incident in phase or out of phase, the excitation cancelling beam 112 and the residual excitation beam 109 can be controlled to interfere destructively at the output 120 and constructively at the exit 122 (or vice versa). With the output 120 selected as the destination for luminescence 114, the beam splitter 116 is selected to have a relatively large reflectivity such as greater than 75%, 80%, 85%, 90%, 95%, 97.5%, 99% or more so that luminescence is efficiently coupled to the output 120. Because high reflectivity is associated with low transmissivity, the excitation cancellation beam magnitude as produced with the first beam splitter 106 is made larger than that of the excitation beam. For first and second beam splitter reflectivities and transmittivities $R_1$, $R_2$ and $T_1$, $T_2$, respectively, setting the $R_1 \cdot T_2 = R_2 \cdot T_1$ permits complete cancellation, absent beam attenuation in propagation to the beam splitter 116. With suitable phase selection, the luminescence 114 is output at 120 as luminescent output 130 with low attenuation. As will be appreciated, the optical system utilizes minimal active components in providing excitation cancellation. In particular, the optical system 100 provides excitation cancellation without using an intensity modulator. This is particularly desirable in single-photon detection applications where the presence of active components may increase the rate of photon loss within the system.

Example 2. Dual Source Excitation Cancellation with Active Phase Control

Figure 2:
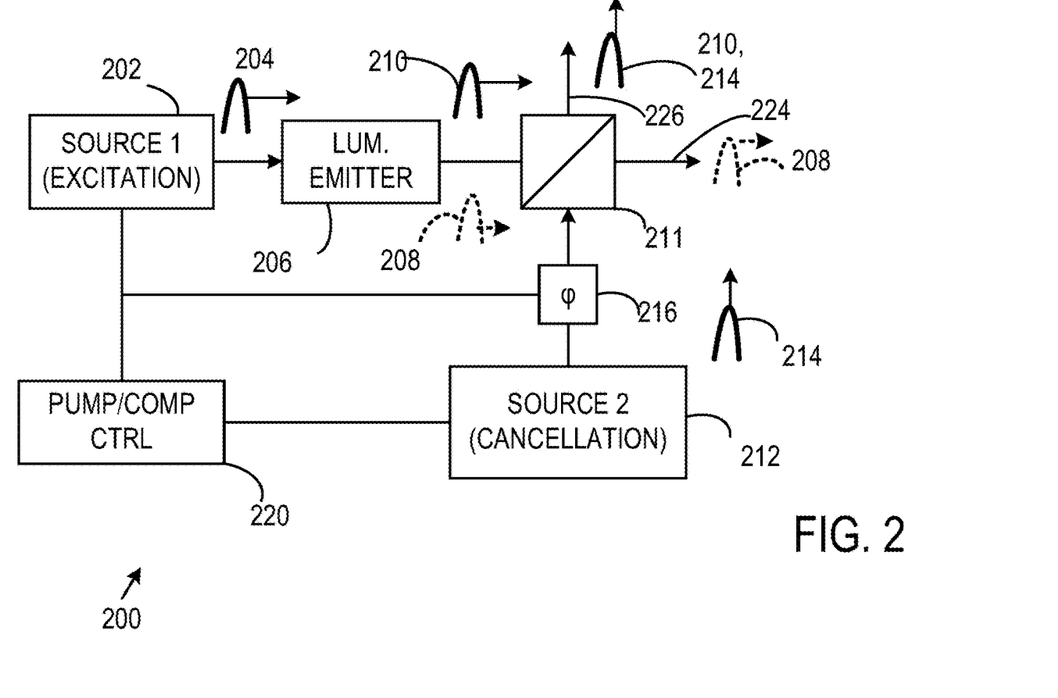
FIG. 2 illustrates a representative excitation cancellation system that includes different sources for an excitation beam and an excitation cancelling beam.

Referring to FIG. 2, a representative excitation cancellation system 200 includes a first beam source 202 situated to direct an excitation beam 204 to a luminescent emitter 206 and produce luminescence 208 and a residual excitation beam 210, both of which are directed to a beam splitter 211, illustrated as a beam splitter cube. A second source 212 is situated to provide an excitation cancelling beam 214 to the beam splitter 211 via a phase modulator 216. The first source 202, the second source 212, and the phase modulator 216 are coupled to a control system 220 that provides drive signals to set beam powers, wavelengths, pulse lengths, and to select time windows for luminescent emission. In the system 200, separate sources for excitation and excitation cancelling beams are provided, although a single source can be used as shown in FIG. 1. The phase modulator 216 is provided in an optical path of the excitation cancelling beam 214 but phase modulators can be provided in either or both of the excitation beam optical path or the excitation cancelling beam optical path. With suitable control and stability of excitation and excitation cancelling beam wavelengths, intensity, and respective optical paths, phase adjustment with a phase modulator is unnecessary. The optical path difference can be set so that the excitation beam 204 and the excitation cancelling beam 214 interfere destructively at an output 224 and constructively at an output 226 or vice versa. As shown, the relative phase of the excitation beam 204 and the excitation cancelling beam 214 are selected so that the residual excitation beam and the excitation cancelling beam interfere destructively at the output 224 so that the luminescence 208 propagates from the output 224 without substantial portions of the residual excitation beam 210 or the excitation cancelling beam 214. In this case, the residual excitation beam 210 and the excitation cancelling beam 214 interfere constructively at the output 226 and these beams propagate out of this output.

The control system 220 provides various control signals so that luminescence is produced with excitation cancellation. For example, for implementation in which external cavity semiconductor lasers or other semiconductor lasers are used, laser currents and temperatures are controlled. Excitation beam and excitation cancelling beam pulse timings are selected by the control system 220 so that the respective beams temporally overlap to interfere. The control system 220 can also control the relative phase shift between the excitation beam and the excitation cancelling beam with the phase modulator 216, if such additional control is necessary.

Example 3. Excitation Cancellation with Passively Set Phase

Figure 3A:
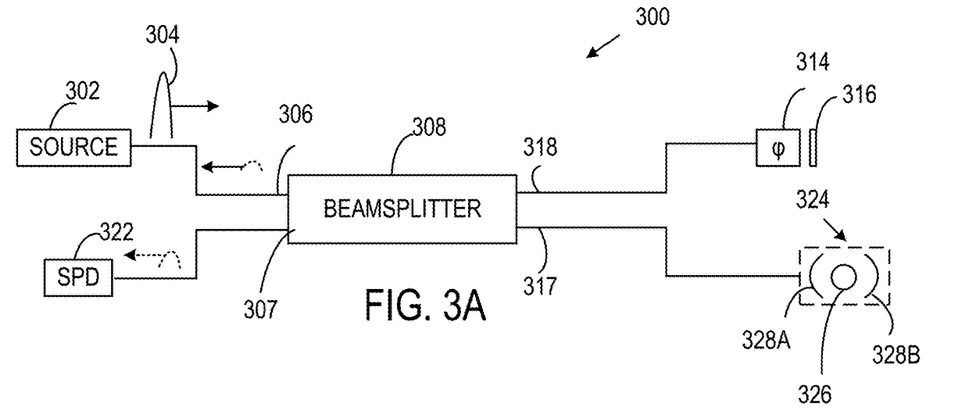
FIG. 3A illustrates a representative excitation cancellation system with passive phase control.
Figures 3B, 3C:
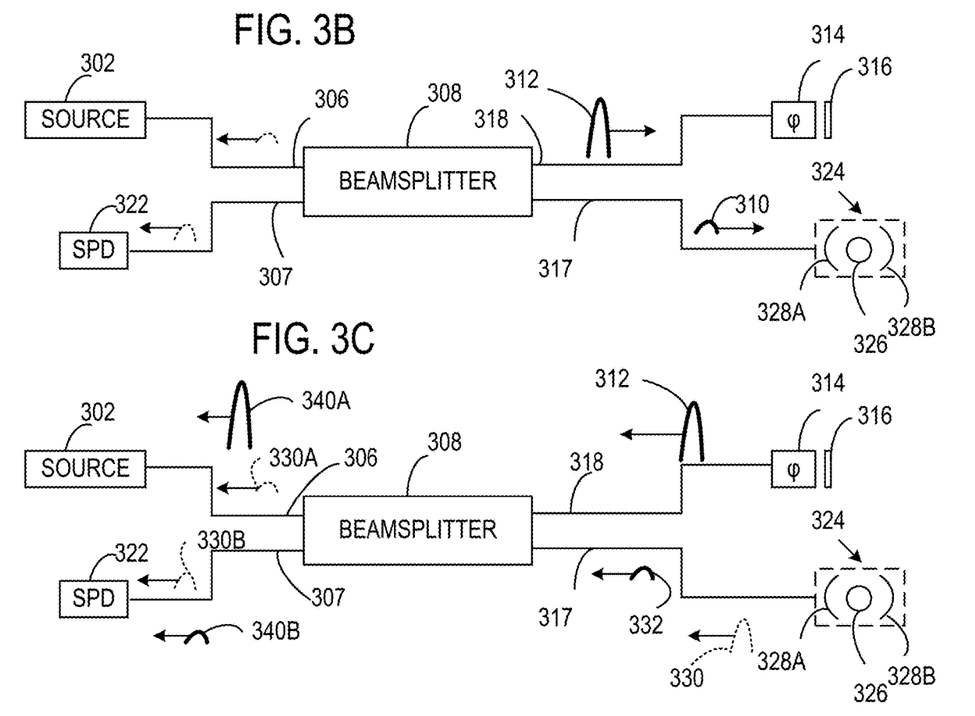
FIGS. 3B-3C illustrate operation of the system of FIG. 3A.

FIGS. 3A-3C illustrate a representative excitation cancellation system 300 with a fixed relative phase between excitation and excitation cancelling beams, without active phase control, and further illustrate operation of the system 300. FIGS. 3B-3C illustrate beam propagating outward from a beam splitter and beams returned to the beam splitter, respectively, to illustrate the system 300 in use. Referring to FIGS. 3A-C, the system 300 includes a source 302 that produces a source beam 304 that is directed to first input port 306 of a beam splitter 308. The beam splitter 308 splits the source beam 304 into an excitation beam 310 and an excitation cancelling beam 312 that are coupled to a first beam splitter output port 317 and a second beam splitter output port 318, respectively. As shown in FIG. 3B, the excitation cancelling beam 312 is directed to a phase compensator 314 and a retroreflector 316. As shown in FIG. 3C, the excitation cancelling beam 312 is returned to the beam splitter 308. The beam splitter 308 couples the excitation cancelling beam 312 to the first input port 306 (used here as an output) and a second input port 307 (used here as an output) of the beam splitter 308. A detector 322 (shown as a single photon superconducting detector) is coupled to the second input port 307 to receive beams from the beam splitter 308. The detector can be a solid state detector (e.g., photodiode, avalanche photodiode), a photomultiplier, a Golay cell, a bolometer, or any other type of detector.

The second output port 317 is coupled to a resonant quantum emitter 324 that includes a luminescence emitter 326 such as a colour center defined in a semiconductor or other crystalline material situated in an optical resonator defined by reflectors 328A, 328B. Luminescence in response to the excitation beam 310 and a residual excitation beam 332 are coupled back to the beam splitter 308 at the second output port 318 (used here as an input) which in turn couples these beams to the first input port 306 and the second input port 307 (both used here as output ports).

Coupling of luminescence, excitation cancelling beams, and residual excitation beams to the input ports of the beam splitter 308 depends on a split ratio of the beam splitter 308 and relative phase of the excitation cancelling beam and the residual excitation beam. In order to use the luminescence efficiently, the split ratio is selected to couple a relatively large portion of the luminescence (more than 75%, 80%, 85%, 90%, or 95%) to the detector 322 so that only a small portion exits the beam splitter at the input port 306 (less than 25% 20%, 15%, 10%, or 5%). Beam splitter splitting ratios between 99:1 and 80:20 are preferred with beam splitter ports arranged to favor delivery of luminescence to the detector 322 or other device or system.

Suppression of a co-propagating residual excitation beam can be especially desirable in applications that use single photon detectors. Such detectors typically have a dead time after photon detection so that detection of residual excitation beam photons prevents detection of luminescence photons which are usually of interest.

Figure 4:
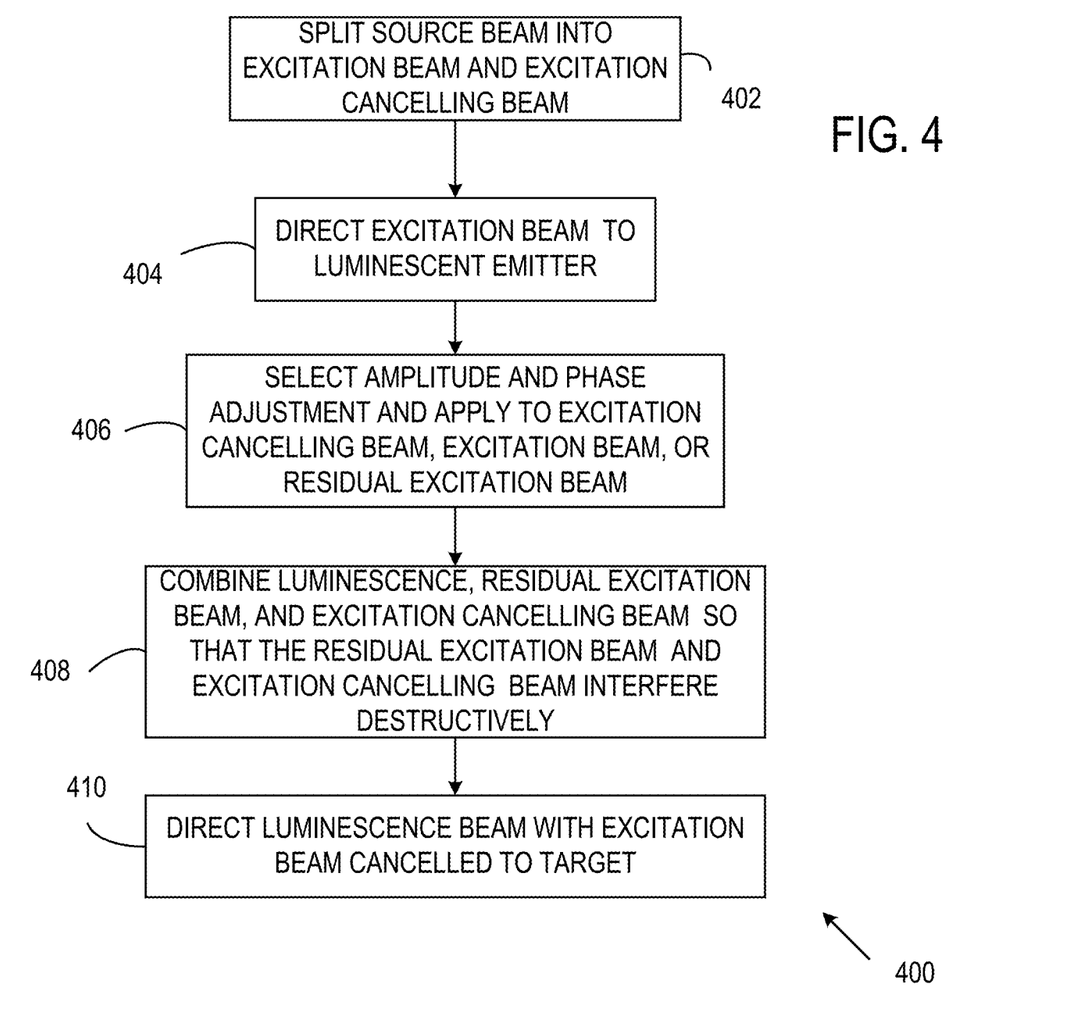
FIG. 4 illustrates a representative method of excitation cancellation.

FIG. 3B illustrates delivery of the excitation beam 310 from the beam splitter 308 to the resonant quantum emitter 324 and delivery of the excitation cancelling beam 312 to the phase compensator 314 and the retroreflector 316; FIG. 3C illustrates delivery of a residual excitation beam 332 and luminescence 330 to the beam splitter 308 and subsequent coupling to the first input port 306 and the second input port 307. Reflectance of the retroreflector typically should match the reflectance of the resonant quantum emitter 324 so that amplitudes of the excitation cancelling beam and the residual excitation beam are matched for cancellation. As illustrated, portions 330A, 330B of the luminescence 330 and portions 340A, 340B of the combined residual excitation beam 312 and the excitation cancelling beam are coupled towards the source 302 or the detector 322, respectively. With appropriate selection of the amplitudes and relative phase of the residual excitation beam 332 and the excitation cancelling beam 312, the portion 340B of the combination is small. Similarly, with appropriate selection of the split ratio of the beam splitter 308, the portion 330B of the luminescence directed towards the detector 322 comprises 80% or more of the collected luminescence Example 4. Representative Excitation Cancellation Methods Referring to FIG. 4, a representative method 400 includes splitting a source beam into an excitation beam and an excitation cancelling beam at 402. At 404, the excitation beam is directed to a luminescence emitter producing a luminescence beam and a residual excitation beam. Amplitudes and a relative phase of the residual excitation beam and the excitation cancelling beam are established at 406 by adjusting the amplitude and/or phase of one or both of these beams. At 408, the combination of the luminescence beam, residual excitation beam, and the excitation cancelling beam is directed to an output with the relative phase established so that the residual excitation beam and the excitation cancelling beam interfere destructively. The luminescent beam then propagates to a target such as detector substantially without remaining portions of the excitation beam or the excitation cancelling beam.

A source beam from a single source can be split into multiple excitation beams and excitation cancelling beams to produce luminescence in multiple luminescent emitters and provide excitation cancelling, or source beams from individual sources can be used. An excitation beam and an excitation cancelling beam for a particular luminescent emitter can be provided from a common source or from different sources. If needed, the SOP of one or more beams can be adjusted for interference, but such SOP control is not included in FIG. 4.

Figure 5A:
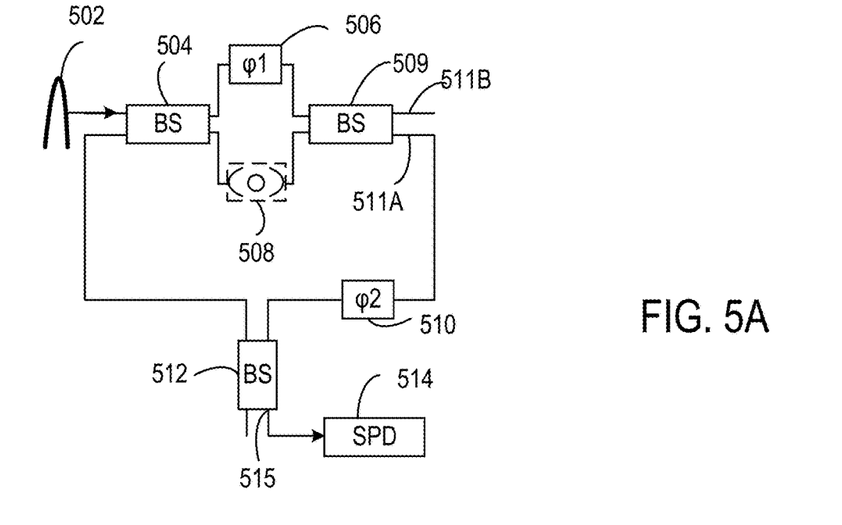
FIG. 5A illustrates a representative excitation cancellation system with passive phase control in which both forward and backward propagating luminescence are captured.

Example 5. Passive Excitation Cancellation with Bidirectional Luminescence Collection Referring to FIG. 5A, representative system 500 includes a first beam splitter 504 that is situated to receive a source beam 502. The beam splitter 504 couples an excitation cancelling beam produced from the source beam 502 to a phase compensator 506 and an excitation beam to a luminescent emitter 508. As discussed above, the luminescent emitter 508 includes a luminescent material situated in an optical resonator. The phase compensator 506 and the luminescent emitter 508 are coupled to a second beam splitter 509 so that a residual excitation beam, a luminescence beam from the luminescent emitter 508, and the excitation cancelling beam are combined. A relative phase of the residual excitation beam and the excitation cancelling beam is established so that these beams interfere destructively and at a beam splitter output 511A, the excitation beam and the excitation cancelling beam are attenuated or eliminated, leaving only a luminescence beam without substantial portions of excitation light. The luminescence beam is directed to a second phase compensator 510 that is coupled to a third beam splitter 512. A constructively interfering residual excitation beam and excitation cancelling beam are coupled to an output 511B of the beam splitter 508.

Excitation of the luminescent emitter 508 can produce luminescence that propagates toward either of the first beam splitter 504 ("backward") or the second beam splitter 509 ("forward"). Forward luminescence propagating toward the beam splitter 509 is discussed above. Backward luminescence propagating toward the first beam splitter 504 is coupled by the first beam splitter 504 to the third beam splitter 512 and combined with the forward luminescence from the second beam splitter 509. By selecting a suitable phase with the second phase compensator 510, forward luminescence and backward luminescence are in phase at an output 515 of the third beam splitter 512 and interfere constructively.

Figure 5B:
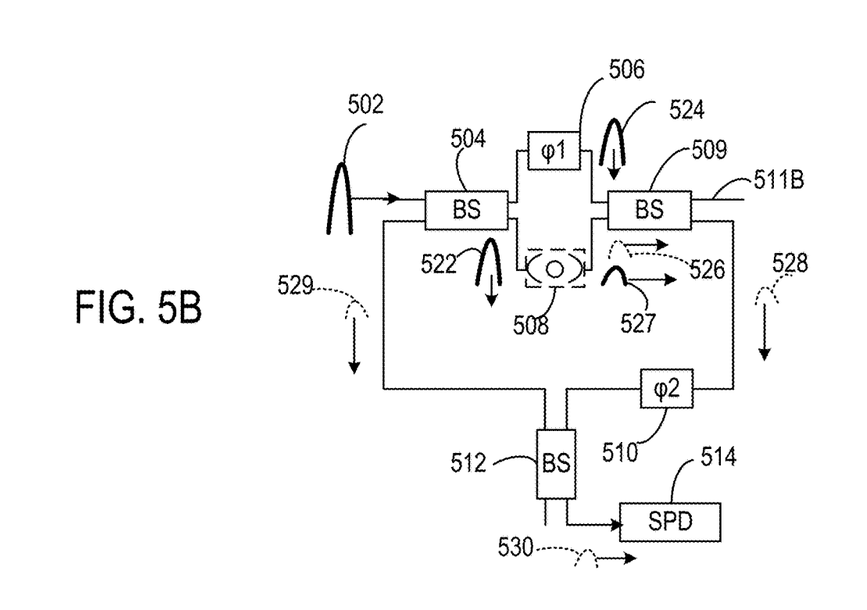
FIG. 5B illustrates operation of the system of FIG. 5A.

FIG. 5B illustrates various beams produced in the apparatus of FIG. 5A in use, including an excitation beam 522, an excitation cancelling beam 524 (after phase compensation), a forward luminescence beam 526 and a residual excitation beam 527 from the luminescent emitter 508, a forward luminescence beam 528 after cancellation of the excitation beam, and a backward luminescence beam 529 as coupled by the first beam splitter 504 to the third beam splitter 512. Constructively interfering beams from the beam splitter 509 at an output 511B are not shown, and the forward luminescence beam 528 is shown with complete excitation cancellation.

The excitation beam 522 can be partially reflected at the luminescent emitter 508, particularly due to the optical resonator associated with the luminescent emitter 508, and the partially reflected beam coupled to the beam splitter 512. Due to this reflection, interference of the residual excitation beam and the excitation cancelling beam at the beam splitter 509 is degraded and a portion of the excitation beam (referred to herein as a "leaked portion") is coupled from the beam splitter 509 to the beam splitter 512. With the phase compensator 510 set so that the luminescent beams 528, 529 interfere constructively at the beam splitter 512, the reflected portion of the excitation beam and the leakage portion interfere destructively. The reflected portion and the leakage portion always interfere oppositely from the luminescent beams 528, 529 because the partial reflection results in a 180 degree phase shift between these portions.

The bidirectional luminescence beams 528, 529 do not experience this reflection-based phase shift.

Example 6. Representative Resonant Luminescent Emitters

Figure 6A:
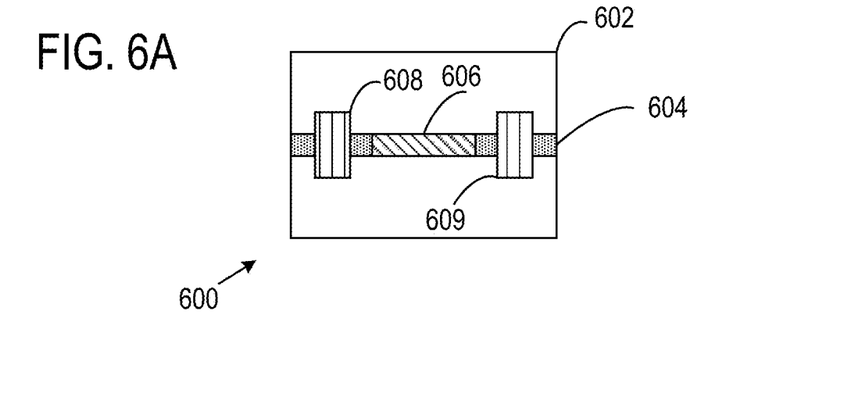
FIGS. 6A-6C illustrate representative resonant luminescence emitters.

Referring to FIGS. 6A, a representative resonant luminescent emitter 600 is defined on a substrate 602 such as a silica, silicon, silicon-on-insulator (all), or other substrate. The resonant luminescent emitter 600 includes a waveguide 604 that is coupled to a luminescence emission region 606 such as a colour centre region in silicon. The luminescent emitter 600 is situated between reflectors 608, 609 that define a resonant cavity of a Fabry-Perot resonator. The reflectors 608, 609 are shown as integrated on the substrate but reflectors external to the substrate 602 can be used. Reflectors can be formed as multilayer dielectric coatings, gratings, holographic reflectors, or based on a refractive index difference between the waveguide 604 and the reflectors 608, 609. Generally, large values of quality factor Q are preferred so that Q is greater than 10, 50, 100, 200, or 500. Cavity optical path length is determined by a waveguide refractive index, luminescence emission region refractive index and length, and reflector separation. Cavity optical length determines resonance frequency spacing and reflector spectral bandwidth determines useful resonator bandwidth.

Figure 6B:
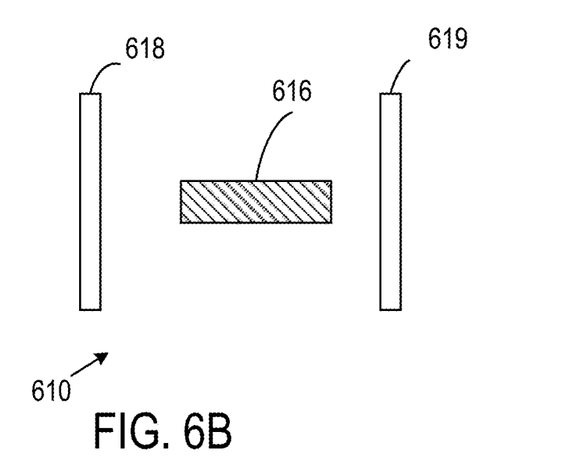
Figure 6C:
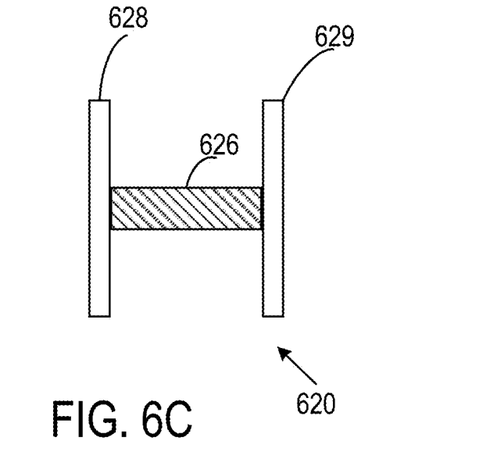

FIGS. 6B-6C illustrate Fabry-Perot resonators 610, 620 that include luminescence emission regions 616, 626 and reflectors 618, 619 and 628, 629, respectively. As shown, a luminescence emission region can extend from reflector to reflector or only partially along an optical path and need not be symmetrical situated with respect to the reflectors. The reflectors are illustrated as planar, but curved reflectors can be used. As shown in FIGS. 6A-6C, Fabry-Perot resonators can include optical paths arranged for guided or unguided propagation. In order to enhance luminescence emission, the resonators are resonant at a luminescence emission frequency or range of frequencies.

Example 7. Representative Excitation Cancelation Conditions

Figure 7A:
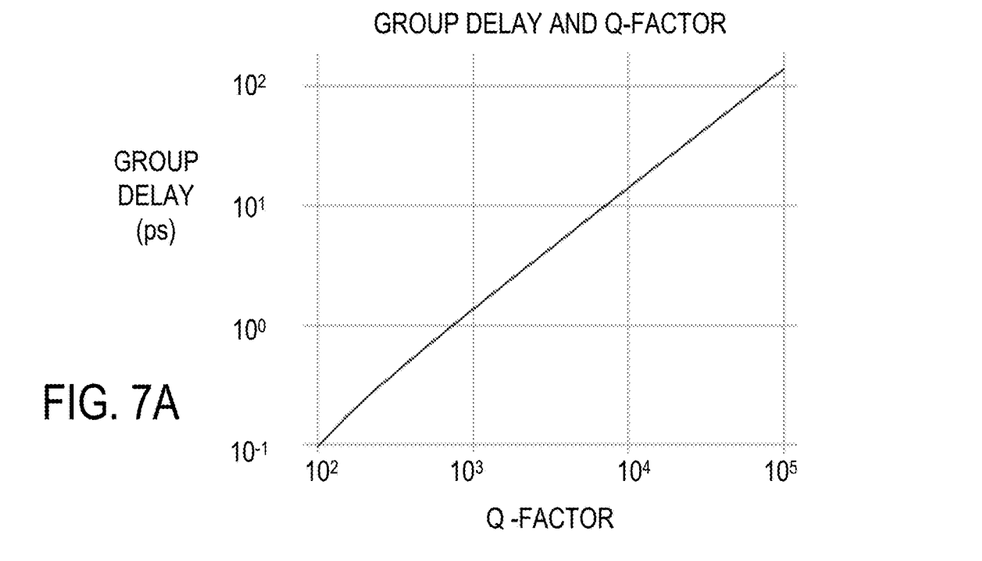
FIG. 7A is a graph illustrating group delay as a function of resonator Q-factor (Q) for a resonator having an optical path length of about 10 µm in a silicon waveguide.

FIG. 7A is a graph of group delay as a function of quality factor (Q) for resonators used in enhancing luminescent emission for a 10 μm path length is a silicon waveguide. In order for an excitation cancelling beam pulse to effectively cancel a residual excitation beam pulse, the pulses must temporally overlap at a beam splitter. As shown in FIG. 7A, a group delay produced with a Q of 10,000 is about 100 ps so that for pulses of durations greater than about 10 ns, group delay does not limit excitation cancellation For shorter pulses, especially pulses have pulse durations of less than 1 ns, an optical path difference between an excitation cancelling beam and a residual excitation beam is preferably selected to compensate for group delay. For a particular pulse length, group delay compensation can be selected to provide temporal overlap of 80%, 90%, 95% or more, wherein temporal overlap is measure as a portion of an excitation pulse measure at that overlaps an excitation pulse with the pulses modeled as square pulses with widths corresponding to the full width at half maximum of the actual pulses. Alternatively, group delay compensation can be adjusted to provide suitable excitation cancellation. Group delay compensation can be variable (i.e., actively controlled), but passive compensation is preferable. As apparent from FIG. 7A, for either long pulses (i.e. pulses having a pulse length longer than a second predefined threshold, such as >10 ns) or low Q (i.e. Q lower than a first predefined threshold, such as Q<100), group delay compensation is typically not required. Conversely, if Q is greater than the first predefined threshold or pulse length is less than the second predefined threshold, group delay compensation may be applied.

Figure 7B:
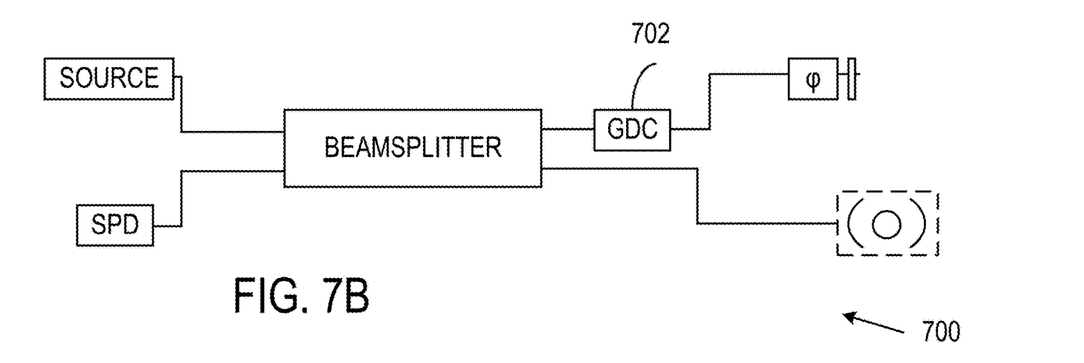
FIG. 7B illustrates a representative excitation cancellation system with group delay compensation.

FIG. 7B illustrates a system 700 similar to that of FIG. 3A but with a group delay compensator 702 in an excitation cancelling beam path. Such a compensator can be formed as an additional path length in a waveguide or otherwise. By contrast with phase adjustment to produce excitation cancellation, group delay compensation requires additional path length (delay) in the path associated with the excitation cancelling beam.

Figure 7C:
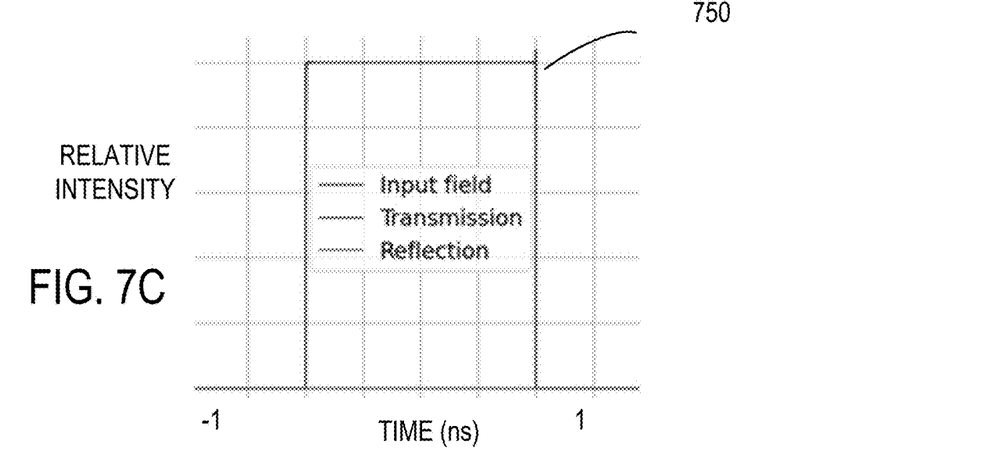
FIGS. 7C-7D illustrate representative temporal pulse shapes of an excitation pulse and reflected and transmitted pulses produced by the resonator used in FIG. 7B.
Figure 7D:
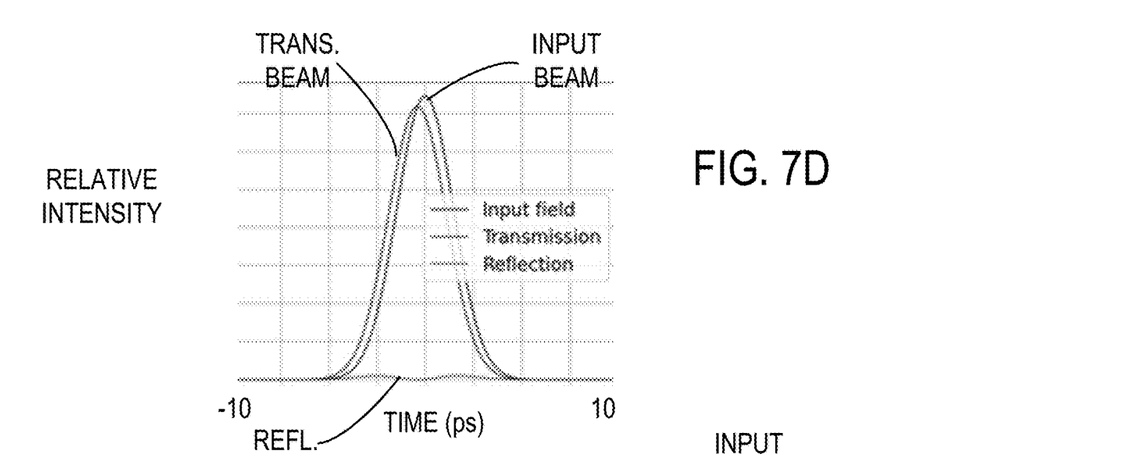
Figure 7E:
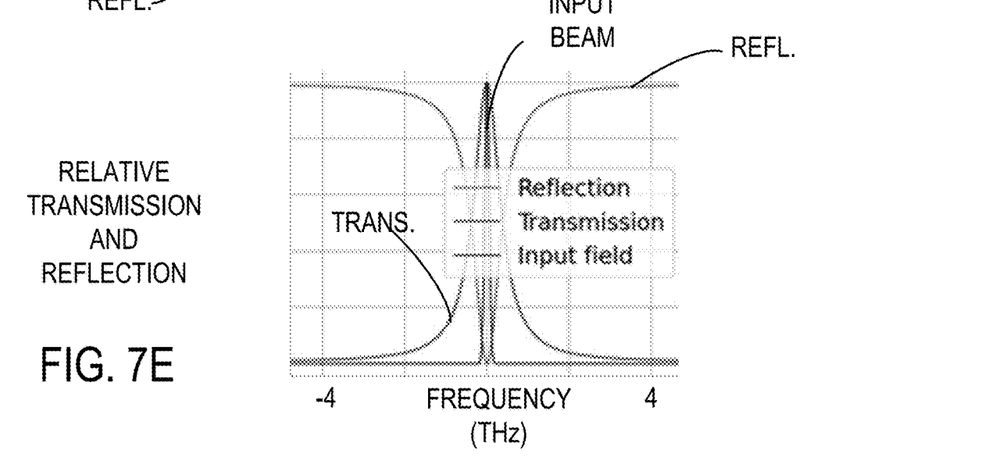
FIG. 7E illustrates representative normalized transmission and reflection spectra of a resonator having a Q=331 and of an excitation pulse having a Gaussian temporal shape.

FIGS. 7C-7D show time delays associated with group delay for a cavity with a Q-factor of 331 and a path length of 10 μm in silicon. For a square pulse of 1 ns duration (FIG. 7C), only a slight difference is noted on a pulse trailing edge 750. For a pulse having a pulse width (FWHM) of about 5 ps (FIG. 7D), a slight temporal offset between an input pulse (associated with an excitation cancelling pulse) and the corresponding reflected pulse (associated with a residual pulse) is apparent. For these examples, the source beam was assumed to be at a cavity resonance frequency as shown in FIG. 7E.

Figure 7F:
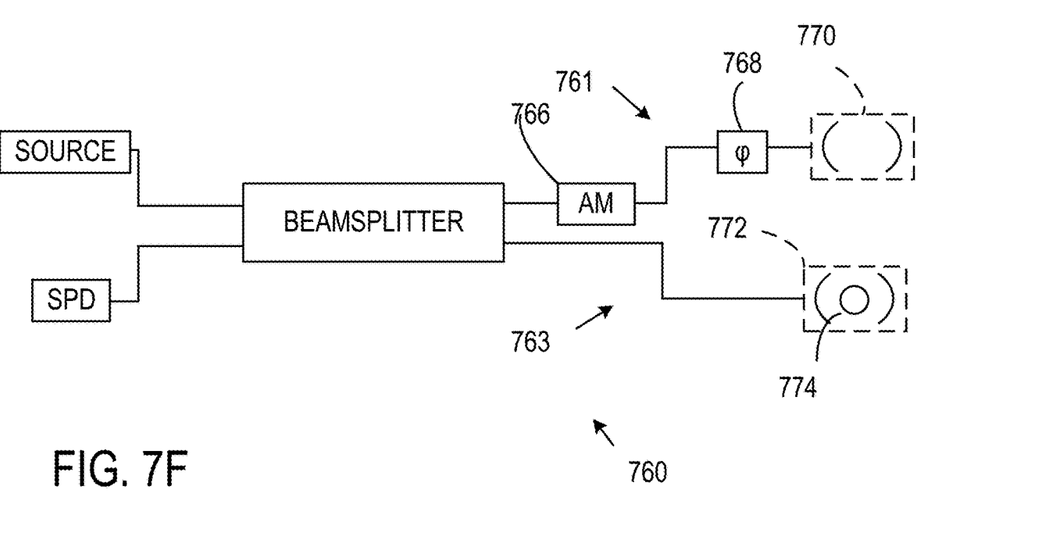
FIG. 7F illustrates a representative excitation cancelling system that provides group delay compensation with similar resonators in the excitation beam path and the excitation cancelling beam path.

FIG. 7F illustrates a system 760 similar to that of FIG. 3A and FIG. 7B but with group delay compensation provided by including a resonator 770 in an excitation cancelling beam path 761. The resonator is generally of similar or the same construction as a resonator 772 in an excitation beam path 763 and which can be provided with a luminescent emitter 774. The excitation cancelling beam path 761 (and/or the excitation beam path 763) can include a fixed or variable phase modulator or phase compensator 768 and include a fixed or variable amplitude modulator or amplitude compensator 766.

Example 8. Representative Interferometer

Figure 8:
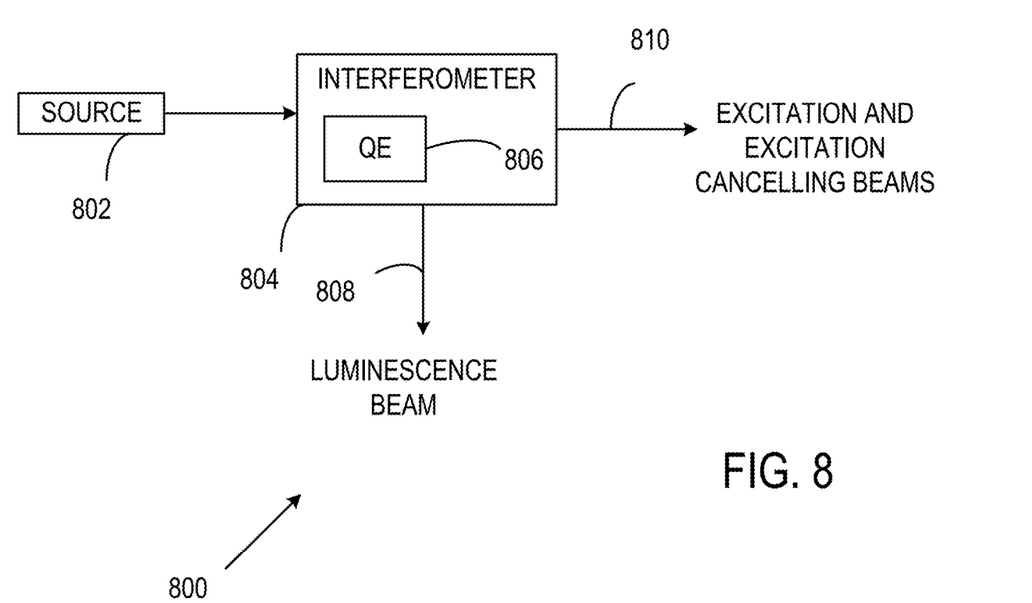
FIG. 8 illustrates a representative excitation cancellation system using a division of amplitude interferometer.

Referring to FIG. 8, a representative excitation cancellation system includes a source 802 such as a wavelength tunable external cavity laser situated to direct a source beam to a division of amplitude interferometer 804 such as Mach-Zehnder or Michelson interferometer. A luminescent emitter 806 such as a resonant luminescence emitter is situated to receive an excitation beam along a first optical path defined by the interferometer 804. Interaction of the excitation beam with the luminescent emitter 806 produces luminescence and a residual excitation beam. A resonant luminescence emitter includes a luminescent material and an optical resonator. With such an emitter, the source 802 is wavelength tuned so that excitation beam wavelength is at a resonance wavelength. An excitation cancelling beam is directed along second optical path defined by the interferometer 804. The residual excitation beam, the luminescence, and the excitation cancelling beam are combined and portions are directed to one or both of a first output 808 and a second output 810. The first and second optical paths are adjusted so that the residual excitation beam and the excitation cancelling beam interfere destructively at one of the first and second outputs 808, 810. As shown, the residual excitation beam and the excitation cancelling beam interfere destructively at the first output 808 at which the luminescence is output, without substantial portions (ideally, none) of the excitation beams.

REPRESENTATIVE EMBODIMENTS

Embodiment 1 is a method, including: directing an excitation beam to a luminescent emitter to produce luminescence; combining a residual excitation beam and the luminescence with an excitation cancelling beam; and setting amplitudes and a relative phase of the excitation beam residual and the excitation cancelling beam so that the residual excitation beam and the excitation cancelling beam interfere destructively on a propagation path associated with the luminescence.

Embodiment 2 includes the subject matter of Embodiment 1, and further includes forming the excitation beam and the excitation cancelling beam from a common source beam.

Embodiment 3 includes the subject matter of any of Embodiments 1-2, and further specifies that the relative phase is fixed based on an optical path difference between the residual excitation beam and the excitation cancelling beam.

Embodiment 4 includes the subject matter of any of Embodiments 1-3, and further specifies that the luminescent emitter is a colour centre material.

Embodiment 5 includes the subject matter of any of Embodiments 1-4, and further specifies that the luminescent emitter is situated in an optical cavity.

Embodiment 6 includes the subject matter of any of Embodiments 1-5, and further specifies that the luminescent emitter is situated along an optical path of an optical resonator.

Embodiment 7 includes the subject matter of any of Embodiments 1-6, and further specifies that the optical resonator is a Fabry-Perot resonator.

Embodiment 8 includes the subject matter of any of Embodiments 1-7, and further specifies that the luminescent emitter is a colour centre material situated along an optical path of a Fabry-Perot resonator.

Embodiment 9 is an optical system, including: a laser; at least one beam splitter situated to receive a source beam produced by the laser and split the source beam into an excitation beam and an excitation cancelling beam; a luminescent emitter situated to receive the excitation beam and produce a luminescence beam in response to the excitation beam, wherein the at least one beam splitter combines a residual excitation beam, the excitation cancelling beam, and the luminescence beam so that the residual excitation beam and the excitation cancelling beam interfere destructively; and a detector situated to receive the luminescence beam without the residual excitation beam and the excitation cancelling beam.

Embodiment 10 includes the subject matter of Embodiments 9, and further includes a reflector situated to receive the excitation cancelling beam and direct the excitation cancelling beam to the beam splitter, wherein the luminescent emitter is situated to direct the luminescence to the beam splitter and the beam splitter is operable to combine the excitation cancelling beam, the residual excitation beam, and the luminescence beam and direct a portion of the combined beams to the detector.

Embodiment 11 includes the subject matter of any of Embodiments 9-10, and further specifies that the luminescent emitter is a colour centre material situated in an optical resonator.

Embodiment 12 includes the subject matter of any of Embodiments 9-11, and further specifies that the optical resonator is a Fabry-Perot resonator having a resonance bandwidth that includes a wavelength of the source beam.

Embodiment 13 includes the subject matter of any of Embodiments 9-12, and further specifies that the optical resonator is an asymmetric Fabry-Perot resonator.

Embodiment 14 includes the subject matter of any of Embodiments 9-13, and further specifies that the luminescence beam received by the detector is a backward propagating luminescence beam.

Embodiment 15 includes the subject matter of any of Embodiments 9-14, and further specifies that the luminescence beam received by the detector is a forward propagating luminescence beam.

Embodiment 16 includes the subject matter of any of Embodiments 9-15, and further specifies that the luminescence beam received by the detector includes a forward propagating luminescent beam and a backward propagating luminescence beam that are combined to interfere constructively.

Embodiment 17 includes the subject matter of any of Embodiments 9-16, and further specifies that the luminescent emitter is a silicon colour centre material.

Embodiment 18 includes the subject matter of any of Embodiments 9-17, and further specifies that the beam splitter is a waveguide beam splitter that directs the excitation beam and the excitation cancelling beam along an excitation beam waveguide and an excitation cancelling beam waveguide that is optically coupled to the luminescent emitter.

Embodiment 19 includes the subject matter of any of Embodiments 9-18, and further includes an optical phase shifter situated to produce a relative phase shift between the residual excitation beam and the excitation cancelling beam so that the residual excitation beam and the excitation cancelling beam interfere destructively.

Embodiment 20 includes the subject matter of any of Embodiments 9-19, and further specifies that the laser is an external cavity semiconductor laser operable to produce the source beam at a wavelength between 1200 nm and 1650 nm, and the detector is a superconducting single photon detector.

Embodiment 21 includes the subject matter of any of Embodiments 9-20, and further specifies that the source beam is a pulsed beam having a source wavelength and produces pulses having a pulse width, the luminescent emitter is situated in an optical resonator having a quality factor and a resonator bandwidth selected so that the source wavelength is within the resonator bandwidth and a group delay associated with the optical resonator is less than $1/10$ of the pulse width.

Embodiment 22 is an optical waveguide system, including: a first waveguide beam splitter situated to receive a source beam and produce a first excitation beam and a first excitation cancelling beam and direct the first excitation beam and the first excitation cancelling beam along an excitation waveguide and an excitation cancelling waveguide respectively; a quantum emitter situated to receive the first excitation beam along an excitation waveguide resulting in luminescence and a residual excitation beam; a second waveguide beam splitter situated to receive and combine the first excitation cancelling beam from the excitation cancelling waveguide and a residual excitation beam and the luminescence from the excitation waveguide, wherein the residual excitation beam and the first excitation cancelling beam interfere destructively at the second waveguide beam splitter; and a third waveguide beam splitter optically coupled to the first waveguide beam splitter and the second waveguide beam splitter to receive luminescence directed by the quantum emitter to the first waveguide beam splitter along a first waveguide optical path and luminescence received by the second waveguide beam splitter along a second waveguide optical path.

Embodiment 23 includes the subject matter of Embodiment 22, and further specifies that the first waveguide optical path and the second waveguide optical path are selected so that the luminescence received from the first waveguide beam splitter and the luminescence received from the second waveguide beam splitter are interfere constructively at the third waveguide beam splitter.

Embodiment 24 includes the subject matter of any of Embodiments 22-23, and further includes a phase modulator situated along at least one of the excitation cancelling waveguide and the excitation waveguide and operable so that the first excitation cancelling beam and the residual excitation beam interfere destructively.

Embodiment 25 includes the subject matter of any of Embodiments 22-24, and further includes a phase modulator situated along at least one of first waveguide optical path and the second waveguide optical path and operable so that the luminescence from the first waveguide beam splitter and the luminescence from second waveguide beam splitter interfere constructively at the third waveguide beam splitter.

Embodiment 26 includes the subject matter of any of Embodiments 22-25, and further includes an optical resonator, wherein the quantum emitter is situated within the optical resonator and the phase modulator is operable so that a reflected excitation beam from the optical resonator interferes destructively with a portion of a transmitted optical beam at the third waveguide beam splitter.

Embodiment 27 is a quantum light source, including; an optical resonator; a luminescent material situated in the optical resonator, wherein the optical resonator has a resonance wavelength corresponding to a luminescent emission wavelength of the luminescent material; a beam source operable to produce an excitation beam and an excitation cancelling beam; and an interferometer defining a first optical path and a second optical path, wherein the excitation beam is coupled to the first optical path and the excitation cancelling beam is directed to the second optical path, wherein the optical resonator and the luminescent material are situated in the first optical path so that luminescence is produced in response to the excitation beam, and the first optical path and the second optical path are defined so that the excitation cancelling beam; and a residual excitation beam cancel and the luminescence is directed out of the interferometer to propagate without substantial portions of the excitation cancelling beam or the residual excitation beam.

Example 28 is a method, including: dividing a source beam into an excitation beam and an excitation cancelling beam; directing the excitation beam to a first resonator; and combining a portion of the excitation cancelling beam and a portion of the excitation beam from the first resonator to produce destructive interference.

Example 29 includes the subject matter of Example 28, and further includes selecting amplitudes and a relative phase of the excitation beam and the excitation cancelling beam so that an amplitude of a beam produced by the destructive interference is less than 10% of the amplitudes of the excitation beam and the excitation cancelling beam.

Example 30 includes the subject matter of any of Examples 28-29, and further includes directing the excitation cancelling beam to a second resonator, wherein the destructive interference is produced by combining a portion of the excitation cancelling beam from the second resonator and a portion of the excitation beam from the first resonator.

Example 31 includes the subject matter of any of Examples 28-30, and further includes situating a luminescent emitter in the first resonator and generating luminescence in response to the excitation beam.

In view of the many possible embodiments to which the principles of the disclosed technology may be applied, it

We claim:

1. A method, comprising:
   directing an excitation beam to a luminescent emitter situated in an optical resonator to produce luminescence, wherein the excitation beam is a pulsed beam comprising pulses having a pulse width;
   combining a residual excitation beam and the luminescence with an excitation cancelling beam;
   causing temporal overlap between the residual excitation beam and the excitation cancelling beam, wherein causing the temporal overlap includes applying a group delay compensation when a quality factor of the optical resonator is greater than a first predefined value or a pulse duration of the excitation beam is less than a second predefined value; and
   setting amplitudes and a relative phase of the residual excitation beam and the excitation cancelling beam so that the residual excitation beam and the excitation cancelling beam interfere destructively on a propagation path associated with the luminescence.

2. The method of claim 1, further comprising forming the excitation beam and the excitation cancelling beam from a common source beam.

3. The method of claim 2, wherein the relative phase is fixed based on an optical path difference between the residual excitation beam and the excitation cancelling beam.

4. The method of claim 1, wherein the luminescent emitter is a colour centre material.

5. The method of claim 1, wherein the optical resonator is a Fabry-Perot resonator.

6. The method of claim 1, wherein the luminescent emitter is a colour centre material situated along an optical path of a Fabry-Perot resonator.

7. The method of claim 1, wherein the first predefined value is 100 and the second predefined value is 10 ns.

8. The method of claim 1, wherein the luminescence comprises a forward propagating luminescence and a backward propagating luminescence that interfere constructively on the propagation path associated with the luminescence.

* * * * *